(12) United States Patent
Galle et al.

(10) Patent No.: US 11,907,663 B2
(45) Date of Patent: Feb. 20, 2024

(54) METHODS FOR UNSUPERVISED PREDICTION OF PERFORMANCE DROP DUE TO DOMAIN SHIFT

(71) Applicant: NAVER FRANCE, Meylan (FR)

(72) Inventors: Matthias Galle, Eybens (FR); Hady Elsahar, Grenoble (FR)

(73) Assignee: NAVER FRANCE, Meylan (FR)

( * ) Notice: Subject to any disclaimer, the term of this patent is extended or adjusted under 35 U.S.C. 154(b) by 317 days.

(21) Appl. No.: 17/240,216

(22) Filed: Apr. 26, 2021

(65) Prior Publication Data
US 2021/0342544 A1    Nov. 4, 2021

Related U.S. Application Data

(60) Provisional application No. 63/017,963, filed on Apr. 30, 2020.

(51) Int. Cl.
*G06F 40/30* (2020.01)
*G06F 40/117* (2020.01)
*G06N 5/04* (2023.01)
*G06N 20/00* (2019.01)
*G06F 16/33* (2019.01)

(52) U.S. Cl.
CPC .......... *G06F 40/30* (2020.01); *G06F 16/3344* (2019.01); *G06F 40/117* (2020.01); *G06N 5/04* (2013.01); *G06N 20/00* (2019.01)

(58) Field of Classification Search
CPC .... G06F 40/30; G06F 16/3344; G06F 40/117; G06N 5/04; G06N 20/00
See application file for complete search history.

(56) References Cited

U.S. PATENT DOCUMENTS

| | | | |
|---|---|---|---|
| 9,965,460 B1* | 5/2018 | Wasiuk | G06F 40/295 |
| 2016/0071022 A1* | 3/2016 | Bruno | G06N 20/00 706/12 |
| 2018/0196795 A1* | 7/2018 | Beller | G06F 40/284 |
| 2021/0064703 A1* | 3/2021 | Roy | G06F 40/30 |
| 2022/0245405 A1* | 8/2022 | Katoh | G06F 18/214 |

OTHER PUBLICATIONS

Ben-David et al. 2009 ; "A theory of learning from different domains" (Year: 2009).*
Tzeng et al. Dec. 2014 "Deep Domain Confusion: Maximizing for Domain Invariance" (Year: 2014).*
Glorot et al. 2011 "Domain Adaptation for Large-Scale Sentiment Classification: A Deep Learning Approach" (Year: 2011).*

(Continued)

*Primary Examiner* — Bhavesh M Mehta
*Assistant Examiner* — Darioush Agahi

(57) ABSTRACT

A system includes: a natural language processing (NLP) model trained in a training domain and configured to perform natural language processing on an input dataset; an accuracy module configured to: calculate a domain shift metric based on the input dataset; and calculate a predicted decrease in accuracy of the NLP model attributable to domain shift relative to the training domain based on the domain shift metric; and a retraining module configured to selectively trigger a retraining of the NLP model based on the predicted decrease in accuracy of the NLP model.

12 Claims, 11 Drawing Sheets

(56) References Cited

OTHER PUBLICATIONS

Alex Graves and Jürgen Schmidhuber. 2005. Framewise phoneme classification with bidirectional lstm and other neural network architectures. Neural Networks, 18(5-6):602-610.
Amittai Axelrod, Xiaodong He, and Jianfeng Gao. 2011. Domain adaptation via pseudo in-domain data selection. ACM.
Amos Storkey. 2009. When training and test sets are different: characterizing learning transfer. Dataset shift in machine learning, pp. 3-28.
Anders Søgaard. 2010. Simple semi-supervised training of part-of-speech taggers. In ACL 2010, Proceedings of the 48th Annual Meeting of the Association for Computational Linguistics, Jul. 11-16, 2010, Uppsala, Sweden, Short Papers, pp. 205-208.
Barbara Plank and Gertjan van Noord. 2011. Effective measures of domain similarity for parsing. In The 49th Annual Meeting of the Association for Computational Linguistics: Human Language Technologies, Proceedings of the Conference, Jun. 19-24, 2011, Portland, Oregon, USA, pp. 1566-1576. The Association for Computer Linguistics.
Bianca Zadrozny and Charles Elkan. 2002. Transforming classifier scores into accurate multiclass probability estimates. In Proceedings of the Eighth ACM SIGKDD International Conference on Knowledge Discovery and Data Mining, Jul. 23-26, 2002, Edmonton, Alberta, Canada, pp. 694-699.
Caroline Brun and Vassilina Nikoulina. 2018. Aspect based sentiment analysis into the wild. In Proceedings of the 9th Workshop on Computational Approaches to Subjectivity, Sentiment and Social Media Analysis, WASSA@EMNLP 2018, Brussels, Belgium, Oct. 31, 2018, pp. 116-122.
Chuan Guo, Geoff Pleiss, Yu Sun, and Kilian Q. Weinberger. 2017. On calibration of modern neural networks. In Proceedings of the 34th International Conference on Machine Learning, ICML 2017, Sydney, NSW, Australia, Aug. 6-11, 2017, pp. 1321-1330.
Dan Hendrycks and Kevin Gimpel. 2017. A baseline for detecting misclassified and out-of-distribution examples in neural networks. In 5th International Conference on Learning Representations, ICLR 2017, Toulon, France, Apr. 24-26, 2017, Conference Track Proceedings. OpenReview.net.
Daniel Kifer, Shai Ben-David, and Johannes Gehrke. 2004. Detecting change in data streams. In (e)Proceedings of the Thirtieth International Conference on Very Large Data Bases, Toronto, Canada, Aug. 31-Sep. 3, 2004, pp. 180-191.
David McClosky, Eugene Charniak, and Mark Johnson. 2006. Effective self-training for parsing. In Human Language Technology Conference of the North American Chapter of the Association of Computational Linguistics, Proceedings, Jun. 4-9, 2006, New York, New York, USA.
Diederik P. Kingma and Jimmy Ba. 2015. Adam: A method for stochastic optimization. In 3rd International Conference on Learning Representations, ICLR 2015, San Diego, CA, USA, May 7-9, 2015, Conference Track Proceedings.
Elsahar, Hady, et al.; "Predicting when Machine Learning Models Fail in Production: Reducing Risks and advancing the decision-making process for Natural Language Processing Models in production"; Blog EMNLP2019 paper; https://medium.com/@hadyelsahar/predicting-when-ml-models-fail-in-production-a8a021592f8a; , Oct. 30, 2019.
Elsahar, Hady, et al.; "Predicting when ML Models Fail in Production: To Annotate or Not? Predicting Performance Drop under Domain Shift"; #EMNLP2019 paper; https://europe.naverlabs.com/blog/predicting-when-machine-learning-models-fail-in-production/, Oct. 30, 2019.
Elsahar, Hady, et al.; "To Annote or Not Predicting Performance Drop under Domain Shift"; EMNLP2019; GitHub https://github.com/hadyelsahar/domain-shift-prediction; Aug. 29, 2019.
Elsahar, Hady, et al.; "To Annote or Not? Predicting Performance Drop under Domain Shift"; Conference on Empirical Methods in Natural Language Processing and 9th International Joint Conference on Natural Language Processing (EMNLP), Hong Kong, China; https://europe.naverlabs.com/research/publications/to-annotate-or-not-predicting-performance-drop-under-domain-shift/; Nov. 3-7, 2019.
Elsahar, Hady, et al.; "To Annote or Not? Predicting Performance Drop under Domain Shift"; Naver Labs Europe, EMNLP 2019; https://www.hadyelsahar.io/papers/to-annotate-or-not-predicting-performance-drop-under-domain-shift; Sep. 1, 2019.
Elsahar, Hady, et al.; "To Annote or Not? Predicting Performance Drop under Domain Shift"; Naver Labs Europe. Conference on Empirical Methods in Natural Language Processing and 9th International Joint Conference on Natural Language Processing (EMNLP), Hong Kong, China, Nov. 3-7, 2019.
Elsahar, Hady; "Predicting when Machine Learning Models Fail in Production"; Naver Labs Europe-Blog; Oct. 30, 2019. https://europe.naverlabs.com/blog/predicting-when-machine-learning-models-fail-in-production/.
Erheng Zhong, Wei Fan, Qiang Yang, Olivier Verscheure, and Jiangtao Ren. 2010. Cross validation framework to choose amongst models and datasets for transfer learning. In Joint European Conference on Machine Learning and Knowledge Discovery in Databases, pp. 547-562. Springer.
Eric Tzeng, Judy Hoffman, Kate Saenko, and Trevor Darrell. 2017. Adversarial discriminative domain adaptation. In 2017 IEEE Conference on Computer Vision and Pattern Recognition, CVPR 2017, Honolulu, HI, USA, Jul. 21-26, 2017, pp. 2962-2971. IEEE Computer Society.
Fangzhao Wu and Yongfeng Huang. 2016. Sentiment domain adaptation with multiple sources. In Proceedings of the 54th Annual Meeting of the Association for Computational Linguistics, ACL 2016, Aug. 7-12, 2016, Berlin, Germany, vol. 1: Long Papers. The Association for Computer Linguistics.
Hidetoshi Shimodaira. 2000. Improving predictive inference under covariate shift by weighting the loglikelihood function. Journal of statistical planning and inference, 90(2): 227-244.
Jeffrey Pennington, Richard Socher, and Christopher D. Manning. 2014. Glove: Global vectors for word representation. In Proceedings of the 2014 Conference on Empirical Methods in Natural Language Processing, EMNLP 2014, Oct. 25-29, 2014, Doha, Qatar, A meeting of SIGDAT, a Special Interest Group of the ACL, pp. 1532-1543. ACL.
Joakim Nivre, Marie-Catherine de Marneffe, Filip Ginter, Yoav Goldberg, Jan Hajic, Christopher D. Manning, Ryan T. McDonald, Slav Petrov, Sampo Pyysalo, Natalia Silveira, Reut Tsarfaty, and Daniel Zeman. 2016. Universal dependencies v1: A multilingual treebank collection. In Proceedings of the Tenth International Conference on Language Resources and Evaluation LREC 2016, Portoroz, Slovenia, May 23-28, 2016. European Language Resources Association (ELRA).
Joaquin Quionero-Candela, Masashi Sugiyama, Anton Schwaighofer, and Neil D Lawrence. 2009. Dataset shift in machine learning. The MIT Press.
John Blitzer and Fernando Pereira. 2007. Domain adaptation of natural language processing systems. University of Pennsylvania, pp. 1-106.
John Blitzer, Koby Crammer, Alex Kulesza, Fernando Pereira, and Jennifer Wortman. 2008. Learning bounds for domain adaptation. In Advances in neural information processing systems, pp. 129-136.
John Blitzer, Mark Dredze, and Fernando Pereira. 2007. Biographies, bollywood, boom-boxes and blenders: Domain adaptation for sentiment classification. In ACL 2007, Proceedings of the 45th Annual Meeting of the Association for Computational Linguistics, Jun. 23-30, 2007, Prague, Czech Republic.
Jose G Moreno-Torres, Troy Raeder, Roco Alaiz-Rodriguez, Nitesh V Chawla, and Francisco Herrera. 2012. A unifying view on dataset shift in classification. Pattern Recognition, 45(1):521-530.
Kimin Lee, Honglak Lee, Kibok Lee, and Jinwoo Shin. 2018. Training confidence-calibrated classifiers for detecting out-of-distribution samples. In 6th International Conference on Learning Representations, ICLR 2018, Vancouver, BC, Canada, Apr. 30-May 3, 2018, Conference Track Proceedings. OpenReview.net.
Konstantin Shmelkov, Cordelia Schmid, and Karteek Alahari. 2018. How good is my gan? In Computer Vision—ECCV 2018—15th

(56) References Cited

OTHER PUBLICATIONS

European Conference, Munich, Germany, Sep. 8-14, 2018, Proceedings, Part II, vol. 11206 of Lecture Notes in Computer Science, pp. 218-234. Springer.
Matt Gardner, Joel Grus, Mark Neumann, Oyvind Tafjord, Pradeep Dasigi, Nelson Liu, Matthew Peters, Michael Schmitz, and Luke Zettlemoyer. 2018. Allennlp: A deep semantic natural language processing platform. arXiv preprint arXiv:1803.07640.
Matthew E. Peters, Mark Neumann, Mohit Iyyer, Matt Gardner, Christopher Clark, Kenton Lee, and Luke Zettlemoyer. 2018. Deep contextualized word representations. In Proceedings of the 2018 Conference of the North American Chapter of the Association for Computational Linguistics: Human Language Technologies, NAACL-HLT 2018, New Orleans, Louisiana, USA, Jun. 1-6, 2018, vol. 1 (Long Papers), pp. 2227-2237. Association for Computational Linguistics.
Miller, Ron: "Arthur announces $3.3M seed to monitor machine learning model performance", Techcrunch; Dec. 11, 2019. https://techcrunch.com/2019/12/11/arthur-announces-3-3m-seed-to-monitor-machine-learning-model-performance/.
Piyush Rai, Avishek Saha, Hal Daum'e III, and Suresh Venkatasubramanian. 2010. Domain adaptation meets active learning. In Proceedings of the NAACL HLT 2010 Workshop on Active Learning for Natural Language Processing, pp. 27-32. Association for Computational Linguistics.
Robert C. Moore and William D. Lewis. 2010. Intelligent selection of language model training data. In ACL 2010, Proceedings of the 48th Annual Meeting of the Association for Computational Linguistics, Jul. 11-16, 2010, Uppsala, Sweden, Short Papers, pp. 220-224. The Association for Computer Linguistics.
Robin Jia and Percy Liang. 2017. Adversarial examples for evaluating reading comprehension systems. In Empirical Methods in Natural Language Processing (EMNLP).
Sebastian Ruder and Barbara Plank. 2017. Learning to select data for transfer learning with bayesian optimization. In Proceedings of the 2017 Conference on Empirical Methods in Natural Language Processing, EMNLP 2017, Copenhagen, Denmark, Sep. 9-11, 2017, pp. 372-382. Association for Computational Linguistics.
Sebastian Ruder and Barbara Plank. 2018. Strong baselines for neural semi-supervised learning under domain shift. In Proceedings of the 56th Annual Meeting of the Association for Computational Linguistics, ACL 2018, Melbourne, Australia, Jul. 15-20, 2018, vol. 1: Long Papers, pp. 1044-1054.
Sebastian Ruder, Parsa Ghaffari, and John G. Breslin. 2017. Data selection strategies for multi-domain sentiment analysis. CoRR, abs/1702.02426.

Shai Ben-David, John Blitzer, Koby Crammer, Alex Kulesza, Fernando Pereira, and Jennifer Wortman Vaughan. 2010. A theory of learning from differentd omains. Machine Learning, 79(1-2):151-175.
Shai Ben-David, John Blitzer, Koby Crammer, and Fernando Pereira. 2006. Analysis of representations for domain adaptation. In Advances in Neural for domain adaptation. In Advances in Neural Information Processing Systems 19, Proceedings of the Twentieth Annual Conference on Neural Information Processing Systems, Vancouver, British Columbia, Canada, Dec. 4-7, 2006, pp. 137-144.
Shiyu Liang, Yixuan Li, and R. Srikant. 2017. Principled detection of out-of-distribution examples in neural networks. CoRR, abs/1706.02690.
Shiyu Liang, Yixuan Li, and R. Srikant. 2018. Enhancing the reliability of out-of-distribution image detection in neural networks. In 6th International Conference on Learning Representations, ICLR 2018, Vancouver, BC, Canada, Apr. 30-May 3, 2018, Conference Track Proceedings. OpenReview.net.
Sujith Ravi, Kevin Knight, and Radu Soricut. 2008. Automatic prediction of parser accuracy. In 2008 Conference on Empirical Methods in Natural Language Processing, EMNLP 2008, Proceedings of the Conference, Oct. 25-27, 2008, Honolulu, Hawaii, USA, A meeting of SIGDAT, a Special Interest Group of ACL, pp. 887-896. ACL.
Terrance DeVries and Graham W. Taylor. 2018. Learning confidence for out-of-distribution detection in neural networks. CoRR, abs/1802.04865.
Vanya V Valindria, Ioannis Lavdas, Wenjia Bai, Konstantinos Kamnitsas, Eric O Aboagye, Andrea G Rockall, Daniel Rueckert, and Ben Glocker. 2017. Reverse classification accuracy: predicting segmentation performance in the absence of ground truth. IEEE transactions on medical imaging, 36(8):1597-1606.
Vincent Van Asch and Walter Daelemans. 2010. Using domain similarity for performance estimation. In Proceedings of the 2010 Workshop on Domain Adaptation for Natural Language Processing, pp. 31-36. Association for Computational Linguistics.
Wei Fan and Ian Davidson. 2006. Reverse testing: an efficient framework to select amongst classifiers under sample selection bias. In Proceedings of the 12th ACM SIGKDD international conference on Knowledge discovery and data mining, pp. 147-156. ACM.
Yaroslav Ganin, Evgeniya Ustinova, Hana Ajakan, Pascal Germain, Hugo Larochelle, Franc, ois Laviolette, Mario Marchand, and Victor S. Lempitsky. 2016. Domain-adversarial training of neural networks. Journal of Machine Learning Research, 17:59:1-59:35.
Zhi-Hua Zhou and Ming Li. 2005. Tri-training: Exploiting unlabeled data using three classifiers. IEEE Trans. Knowl. Data Eng., 17(11):1529-1541.

* cited by examiner

METHODS FOR UNSUPERVISED PREDICTION OF PERFORMANCE DROP DUE TO DOMAIN SHIFT

CROSS-REFERENCE TO RELATED APPLICATIONS

This application claims the benefit of U.S. Provisional Application No. 63/017,963 filed on Apr. 30, 2020. The entire disclosure of the application referenced above is incorporated herein by reference.

GOVERNMENT SUPPORT

The project leading to this application has received funding from the European Union's Horizon 2020 research and innovation programme under grant agreement No 786741.

FIELD

The present disclosure relates to natural language processing (NLP) and more particularly to systems and methods for determining performance drop of NLP models due to domain shift.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Use of computers, smartphones, and other Internet-connected devices has grown exponentially. Users utilize Internet-connected devices for many different tasks. For example, a user may utilize an Internet-connected device to search for local businesses, such as restaurants. As another example, a user may utilize an Internet-connected device to obtain directions to navigate to a desired location. As yet another example, a user may utilize an Internet-connected device to perform one or more building related functions, such as turn on a light within a building, adjust heating or cooling of a building, or open or close a garage door. As yet another example, a user may utilize an Internet-connected device to search for information on a topic, place an order, answer a question, etc.

SUMMARY

In a feature, a system includes: a natural language processing (NLP) model trained in a training domain and configured to perform natural language processing on an input dataset; an accuracy module configured to: calculate a domain shift metric based on the input dataset; and calculate a predicted decrease in accuracy of the NLP model attributable to domain shift relative to the training domain based on the domain shift metric; and a retraining module configured to selectively trigger a retraining of the NLP model based on the predicted decrease in accuracy of the NLP model.

In further features, the retraining module is configured to trigger a retraining of the NLP model when the predicted decrease in accuracy of the NLP model is greater than a predetermined value, where the predetermined value is greater than zero.

In further features, the domain shift metric is a h-divergence base metric.

In further features, the accuracy module is configured to calculate the domain shift metric using the equation:

$$2 \sup_{h \in H} |Pr_{x \sim D_s}[h(x) = 1] - Pr_{x \sim D_t}[h(x) = 1]|$$

where h is a hypothesis and h(x) the output of that hypothesis on data-point x sampled from one of a training dataset in the training domain and a target dataset in a target domain.

In further features, the domain shift metric is a confidence metric.

In further features, the accuracy module is configured to calculate the domain shift metric using the equation:

$$\text{CONF\_CALIB} = \frac{1}{|U_s|} \sum_{i: x_i \in U_s} \widehat{q}_i - \frac{1}{|U_t|} \sum_{j: x_j \in U_t} \widehat{q}_j$$

where $\widehat{q}_i$ is a calibrated confidence metric for data-point $x_i$, CONF_CALIB is the domain shift metric, $U_s$ represents data in the training domain, and $U_t$ represents data in a target domain.

In further features, the domain shift metric is a proxy A domain (PAD) metric.

In further features, the accuracy module is configured to calculate the domain shift metric using the equation PAD*=1−2ε($G^*_d(G_f(x))$), where PAD* is the domain shift metric, ε is a predetermined scalar value, and $\theta_f$ and $\theta_y$ are learned by minimizing a loss function, and learnable parameters of $G_f$ and $G^*_d$ are learned parameters.

In further features, the domain shift metric is a reverse classification accuracy (RCA) metric.

In further features, the accuracy module is configured to calculate the domain shift metric using the equation:

$$RCA* = \frac{1}{U'_s} \sum_{x_i, y_i \in U'_s}^{m'} \mathbb{1}[y_i = C'(x_i)] - \mathbb{1}[y_i = \overline{C}(x_i)],$$

where RCA* is the domain shift metric, C' is a classifier learned on out-of-domain data and $\overline{C}$ the classifier learned on held-out in-domain data, $x_i$ and $y_i$ are data-points, $U'_s$ represents data in the training domain.

In further features, a results module is configured to: determine a sentiment regarding a subject based on an output of the NLP model; and provide results including the sentiment to a computing device from which a query regarding the subject was received.

In further features, a results module is configured to determine a tag for a point of speech (POS) based on an output of the NLP model.

In further features, the NLP model is trained based on a training dataset that is different than the input dataset.

In further features, the training domain of the training dataset is different than a second domain of the input dataset.

In further features, the input dataset includes text of N social media posts, where N is an integer greater than 0.

In a feature, a system includes: a training module configured to: train, using a training dataset in a training domain, a machine learning (ML) model to perform processing on an input dataset; determine properties of a domain shift metric for the training dataset in the training domain; an accuracy module configured to: calculate the domain shift metric based on the input dataset; and calculate a predicted decrease in accuracy of the ML model attributable to domain shift relative to the training domain based on the domain shift metric using the properties of the domain shift metric for the training dataset; and a retraining module configured to selectively trigger a retraining of the ML model based on the predicted decrease in accuracy of the ML model.

In further features, the retraining module is configured to trigger a retraining of the ML model when the predicted decrease in accuracy of the ML model is greater than a predetermined value, where the predetermined value is greater than zero.

In further features, the ML model is a natural language processing (NLP) model that is trained based on a training dataset that is different than the input dataset.

In a feature, a computerized method is performed by one or more processors, the method includes: training a natural language processing (NLP) model using a training dataset to perform natural language processing on an input dataset; after receiving the input dataset that is different than the training dataset: calculating a domain shift metric based on the input dataset; and calculating a predicted decrease in accuracy of the NLP model attributable to domain shift relative to a training domain based on the domain shift metric; and selectively triggering a retraining of the NLP model based on the predicted decrease in accuracy of the NLP model.

In a feature, a system includes: a natural language processing (NLP) model trained in a training domain and configured to perform natural language processing on an input dataset; a means for: calculating a domain shift metric based on the input dataset; and calculating a predicted decrease in accuracy of the NLP model attributable to domain shift relative to the training domain based on the domain shift metric; and a means for selectively trigger a retraining of the NLP model based on the predicted decrease in accuracy of the NLP model.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Natural language processing (NLP) models can be used for various tasks, such as sentiment analysis, point of speech tagging, etc. Such NLP models are typically trained based on a training dataset in a source domain (i.e., a training domain). If the input (i.e., an input dataset) to an NLP model changes to a second domain that is different than the source domain, the accuracy of the NLP model may decrease.

More generally, the present application involves predicting an accuracy drop of a machine learning (ML) model attributable to a shift in domain of the input to the ML model away from a domain used to train (i.e., the training domain) the ML model (i.e., domain shift). For example, a proxy A distance (PAD) metric, a reverse classification accuracy (RCA) metric, or a confidence based metric may be calculated to predict the accuracy drop of the NLP model due to domain shift. Retraining of the NLP model may be performed when the accuracy drop becomes greater than a predetermined value. While the example of an NLP model is provided, the present application is also applicable to other types of ML models such as speech models and vision models. Also, while the example of a search system will be provided as one example, the present application is not limited to the example of search systems.

Figure 1:
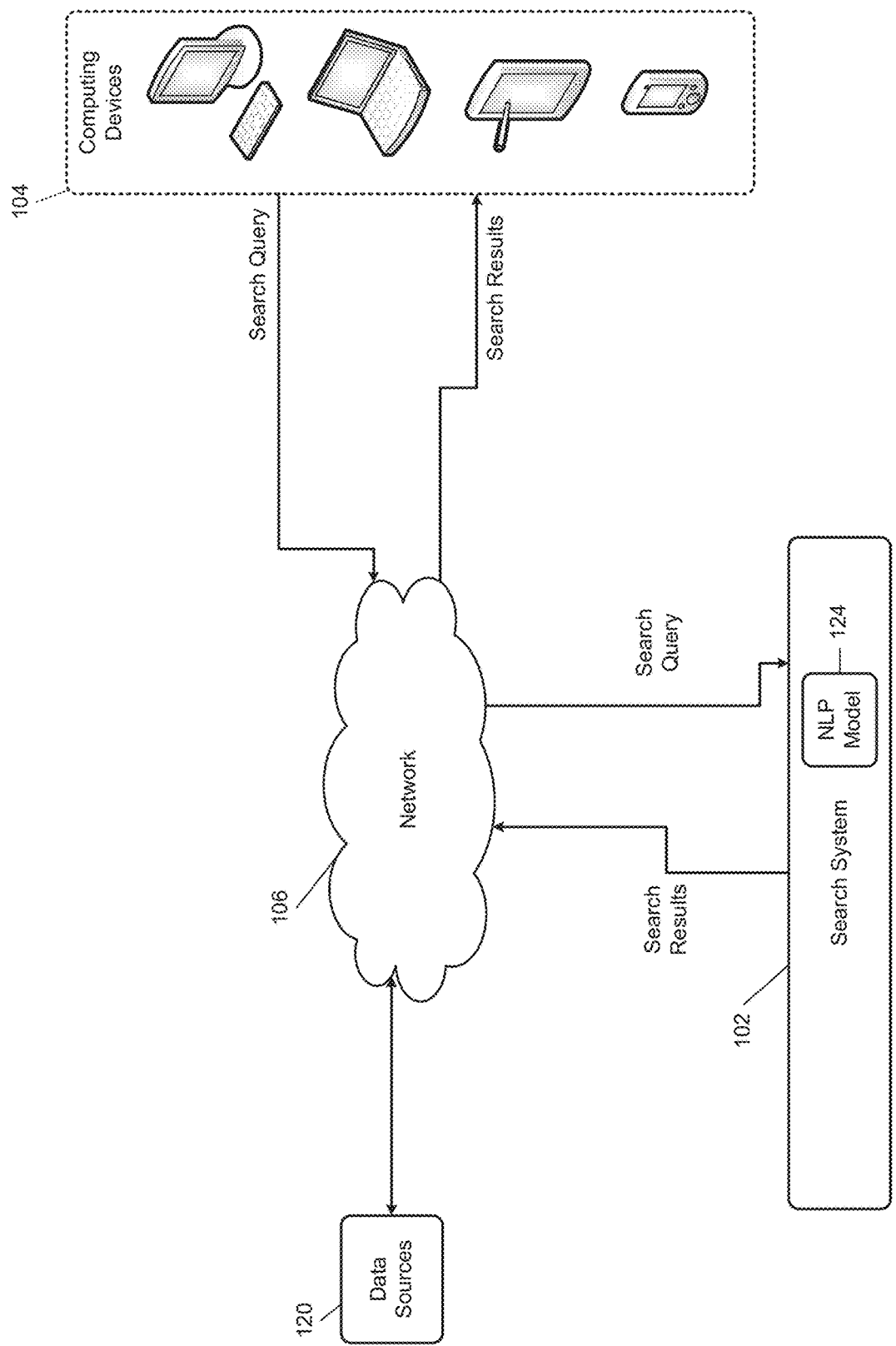
FIG. 1 includes a functional block diagram of an example environment including a search system configured to provide search results in response to queries.

FIG. 1 includes a functional block diagram including a search system 102 configured to respond to queries. The search system 102 is configured to receive queries from one or more user computing device(s) 104 via a network 106. The search system 102 performs searches based on the queries, respectively, to identify one or more search results. The search system 102 transmits the results back to the computing devices 104 that transmitted the queries, respectively. For example, the search system 102 may receive queries requesting (present) sentiment (e.g., positive, negative, neutral) regarding an entity, such as a corporate entity (e.g., a publicly traded entity). Inventors may make investment decisions based on the sentiment for an entity. The search system 102 may provide results indicative of the sentiment to the computing devices 104.

The computing devices 104 may display or otherwise output the results to users. The computing devices 104 may also display other information to the users. For example, the computing devices 104 may display additional information related to the results, advertisements related to the results, and/or other information. The search system 102 and the computing devices 104 communicate via a network 106.

A plurality of different types of computing devices 104 are illustrated in FIG. 1. An individual user computing device may also be referred to herein as a user device 104. The computing devices 104 include any type of computing devices that is configured to generate and transmit queries to the search system 102 via the network 106. Examples of the computing devices 104 include, but are not limited to, smart (cellular) phones, tablet computers, laptop computers, and desktop computers, as illustrated in FIG. 1. The computing devices 104 may also include other computing devices having other form factors, such as computing devices included in vehicles, gaming devices, televisions, consoles (e.g., smart speakers without displays Amazon Echo, Google Home, Clova Friends mini) or other appliances (e.g., networked refrigerators, networked thermostats, etc.).

The computing devices 104 may use a variety of different operating systems. In an example where a computing device 104 is a mobile device, the computing device 104 may run an operating system including, but not limited to, Android, iOS developed by Apple Inc., or Windows Phone developed by Microsoft Corporation. In an example where a computing device 104 is a laptop or desktop device, the computing device 104 may run an operating system including, but not limited to, Microsoft Windows, Mac OS, or Linux. The computing devices 104 may also access the search system 102 while running operating systems other than those operating systems described above, whether presently available or developed in the future.

In some examples, a computing device 104 may communicate with the search system 102 using an application installed on the computing device 104. In general, a computing device 104 may communicate with the search system 102 using any application that can transmit queries to the search system 102 to be responded to (with results) by the search system 102. In some examples, a computing device 104 may run an application that is dedicated to interfacing with the search system 102, such as an application dedicated to performing searching and providing search results. In some examples, a computing device 104 may communicate with the search system 102 using a more general application, such as a web-browser application. The application executed by a computing device 104 to communicate with the search system 102 may display a search field on a graphical user interface (GUI) in which the user may input queries. The user may input a query, for example, by adding text to a text field using a touchscreen or physical keyboard, a speech-to-text program, or other form of user input.

A text query entered into a GUI on a computing device 104 may include words, numbers, letters, punctuation marks, and/or symbols. In general, a query may be a request for information identification and retrieval from the search system 102. For example, a query including text may be directed to providing a sentiment regarding an entity, such as a corporate entity (e.g., a publicly traded entity), that most closely matches the text of the query.

A computing device 104 may receive results from the search system 102 that is responsive to the search query transmitted to the search system 102. In various implementations, the computing device 104 may receive and the search system 102 may transmit multiple results that are responsive to the search query or multiple items (e.g., entities) identified in a query. In the example of the search system 102 providing multiple results, the search system 102 may determine a confidence value (indicative of a likelihood of a result is the most relevant result to the query) for each of the results and provide the confidence values along with the results to the computing device 104. The computing device 104 may display more than one of the multiple results (e.g., all results having a confidence value that is greater than a predetermined value), only the result with the highest confidence value, the results having the N highest confidence values (where N is an integer greater than one), etc.

The computing device 104 may be running an application including a GUI that displays the result(s) received from the search system 102. The respective confidence value(s) may also be displayed, or the results may be displayed in order (e.g., descending) based on the confidence values. For example, the application used to transmit the query to the search system 102 may also present (e.g., display or speak) the received search results(s) to the user via the computing device 104. As described above, the application that presents the received result(s) to the user may be dedicated to interfacing with the search system 102 in some examples. In other examples, the application may be a more general application, such as a web-browser application.

The GUI of the application running on the computing device 104 may display the search result(s) to the user in a variety of different ways, depending on what information is transmitted to the computing device 104. In examples where the results include a list of results and associated confidence values, the search system 102 may transmit the list of results and respective confidence values to the computing device 104. In this example, the GUI may display the result(s) and the confidence value(s) to the user as a list of possible results.

In some examples, the search system 102, or another computing system, may transmit additional information to the computing device 104 such as, but not limited to, applications and/or other information associated with the results, the query, points of interest associated with the results, etc. This additional information may be stored in a data store and transmitted by the search system 102 to the computing device 104 in some examples. In examples where the computing device 104 receives the additional information, the GUI may display the additional information along with the result(s). In some examples, the GUI may display the results as a list ordered from the top of the screen to the bottom of the screen by descending confidence value. In some examples, the results may be displayed under the search field in which the user entered the query.

In some examples, the computing devices 104 may communicate with the search system 102 via another computing system. The other computing system may include a computing system of a third party that may leverage the search functionality of the search system 102. The other computing system may belong to a company or organization other than that which operates the search system 102. Example parties which may leverage the functionality of the search system 102 may include, but are not limited to, internet search providers and wireless communications service providers. The computing devices 104 may send queries to the search system 102 via the other computing system. The computing devices 104 may also receive results from the search system 102 via the other computing system. The other computing system may provide a user interface to the computing devices 104 in some examples and/or modify the user experience provided on the use computing r devices 104.

Data regarding search results (i.e., input dataset) from which the search system 102 determines the results for queries may be stored in one or more data sources 120. The data sources 120 may include a variety of different data providers. The data sources 120 may include digital distribution platforms such as, but are not limited to, online news sources, websites, social networking sites (e.g., Facebook, Instagram, Twitter, etc.), databases, and/or other types of data sources. Some data sources may be supplemented or updated frequency. For example, social networking sites may be updated numerous times per second as users make social media posts.

The computing devices 104, the search system 102, and the data sources 120 may be in communication with one another via the network 106. The network 106 may include various types of networks, such as a wide area network (WAN) and/or the Internet. Although the network 106 may represent a long range network (e.g., Internet or WAN), in some implementations, the network 106 may include a shorter range network, such as a local area network (LAN). In one embodiment, the network 106 uses standard communications technologies and/or protocols. Thus, the network 106 can include links using technologies such as Ethernet, Wireless Fidelity (WiFi) (e.g., 802.11), worldwide interoperability for microwave access (WiMAX), 3G, 4G, 5G, Long Term Evolution (LTE), digital subscriber line (DSL), asynchronous transfer mode (ATM), InfiniBand, PCI Express Advanced Switching, etc. Similarly, the networking protocols used on the network 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 106 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In other examples, the network 106 can use custom and/or dedicated data communications technologies instead of, or in addition to, the ones described above.

The search system 102 determines the search results based on the output of a natural language processing (NLP) model 124. The NLP model 124 generates the output by performing NLP on a dataset from the data sources 120. The dataset may include, for example, the N social media posts (e.g., from at least one of Twitter, Facebook, and Instagram) having the most recent time stamps (relative to the present time and date) that are associated with a subject of the query. N is an integer greater than zero, and may be 100 or greater than 100. The dataset changes over time as information on the subject of the query changes. Changes in the dataset may be referred to as domain shift.

Figure 2:
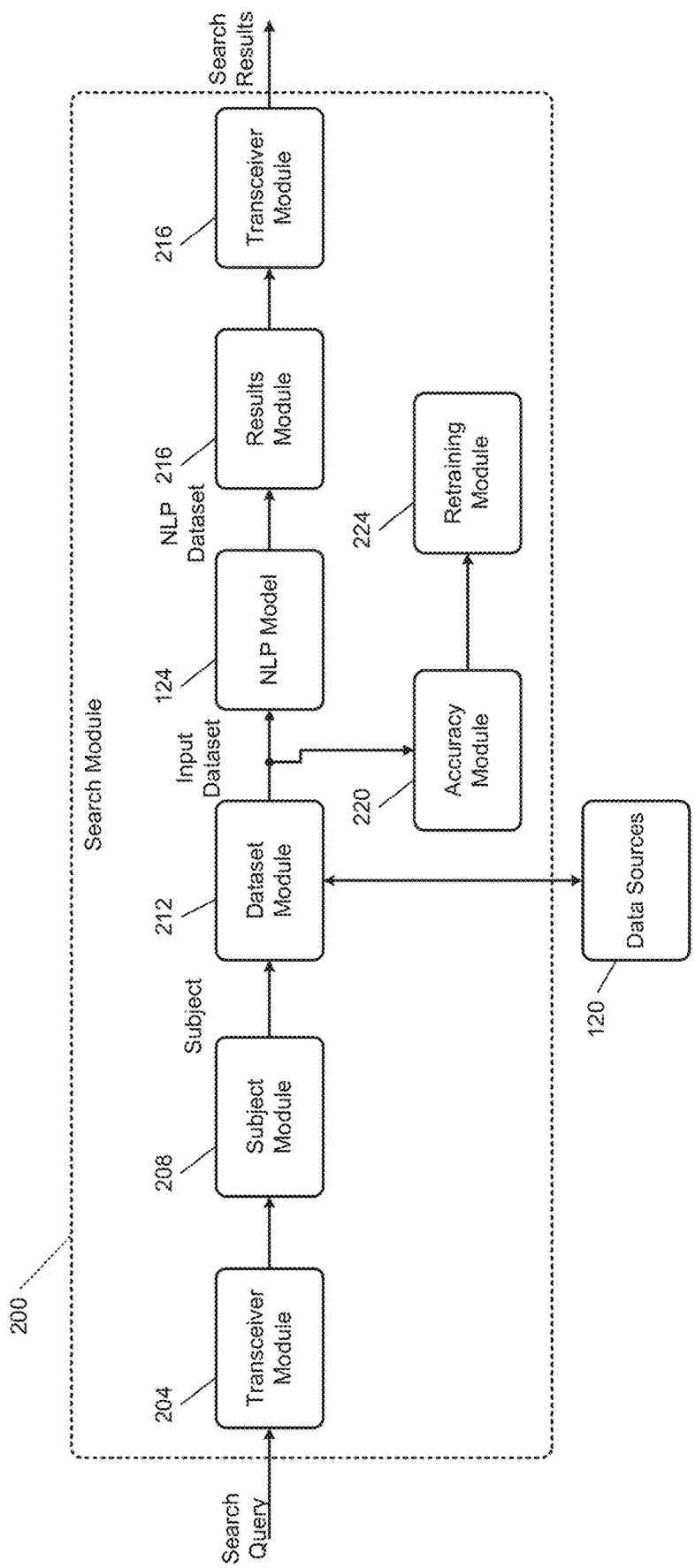
FIG. 2 is a functional block diagram including an example implementation of a search module of the search system.

FIG. 2 is a functional block diagram including an example implementation of a search module 200 of the search system 102. A first transceiver module 204 receives a search query regarding a subject from a computing device 104. A subject module 208 parses the search query and determines a subject of the search query. As an example, the subject may be an entity, such as a corporate entity (e.g., a publicly traded corporate entity that has a listing on a stock index).

Based on the subject, a dataset module 212 determines a results dataset in the data sources 120 that will be used to determine the results for the search query. For example, the dataset module 212 may select the N social media posts (e.g., from at least one of Twitter, Facebook, and Instagram) having the most recent time stamps (relative to the present time and date) that are associated with the subject. N is an integer greater than zero, and may be 100 or greater than 100. The NLP model 124 performs natural language processing on an input dataset, which in this example is the results dataset, to produce an NLP dataset.

A results module 216 determines the search results based on the NLP dataset output by the NLP model 124. For example, the NLP model 124 may classify each piece of the NLP dataset as having a positive, negative, or neutral sentiment regarding the subject. The results module 216 may set a sentiment for the subject based on the classifications of the NLP model 124. For example, the results module 216 may increment a counter by 0 for each negative classification, by ½ of a predetermined maximum value (e.g., ½ of 2) for each neutral classification, and by a predetermined maximum value (e.g., 2) for each positive classification. The results module 216 may determine that the sentiment for the subject is positive when the counter is greater than a first predetermined value (e.g., ⅔*the predetermined maximum value*N), neutral when the counter value is between the first predetermined value and a second predetermined value (e.g., ⅓*the predetermined maximum value*N), inclusive, and negative when the counter value is less than the second predetermined value. While one example of setting the sentiment is provided, the sentiment for the subject may be determined in another suitable manner.

A second transceiver module 216 transmits the determined search results for the search query back to the computing device 104 via the network 106. In various implementations, the second transceiver module 216 may be omitted, and the first transceiver module 204 may transmit the results back to the computing device 104 from which the query was received. The results may include, for example, the sentiment regarding the subject of the query in the example of sentiment analysis. While the example of sentiment analysis is provided, the present application is also applicable to other uses of NLP models, such as question answering, point of speech labeling/tagging, etc.

The NLP model 124 is trained based on a training dataset, as discussed further below. Accuracy of the NLP model 124 may decrease, however, when domain shift occurs. In this regard, an accuracy module 220 determines an accuracy (performance) drop (decrease) of the NLP model 124. A retraining module 224 initiates retraining of the NLP model 124 when the accuracy drop is greater than a predetermined value. Training and retraining of the NLP model 124 is discussed further below.

Performance drop due to domain shift may affect the accuracy of the NLP model 124. This problem may create an urge by programmers to continuously annotate evaluation datasets to measure the expected drop in the performance in the NLP model 124. However, this process can be prohibitively expensive and slow.

The present application involves determining accuracy drop of the NLP model 124 that is attributable to domain shift without the inclusion of any target domain labels.

The present application involves determining the performance drop of a classifier C (e.g., the NLP model 124), trained on domain $U_s$ when applied to a different domain $U_t$. In the presence of labeled data over $U_t$, the performance drop could be empirically measured by the difference in test errors between the source domain ($U_s$) and target domain ($U_t$). The following equation is representative of performance drop. The accuracy module 220 may use the equation below to determine the accuracy (performance) drop.

$$\Delta \mathcal{R} = \underset{(x,y) \in U_s}{Pr}(C(x) \neq y) - \underset{(x,y) \in U_t}{Pr}(C(x) \neq y)$$

where ΔR is the performance drop and Pr is performance, x represent data-points and their associated labels y, and C(x) is the prediction of the classifier for data-point x.

To calculate performance drop empirically, annotated examples in the form of a labeled test set for each target domain may be used. This, however, would be costly and/or time-consuming. The present application involves domain shift metrics of different natures that correlate with the performance drop of the NLP model 124 without any annotated examples from the target domain ($U_t$). One example domain shift metric is referred to as $\mathcal{H}$-divergence based metrics based on the capacity of another classification model to distinguish between samples from $U_s$ and $U_t$. Another example is confidence based metrics using the certainty of the model over its prediction. Another example is reverse classification accuracy (RCA) where predicted values are used as pseudo-labels over $U_t$.

$\mathcal{H}$-Divergence Based Metrics $\mathcal{H}$-divergence based metrics detect domain change in data streams and define the target error of a model under domain shift in terms of its source error and the divergence between the source and the target domains ($U_s$ and $U_t$). $\mathcal{H}$-divergence can be formalized as follows. Given a hypothesis class $\mathcal{H}$ that includes a set of binary classifiers $h:X \rightarrow \{0,1\}$, the $\mathcal{H}$-divergence can be represented as:

$$\underset{h \in H}{2sup} |Pr_{x \sim D_s}[h(x)=1] - Pr_{x \sim D_t}[h(x)=1]|$$

where h is a hypothesis and h(x) the output of that hypothesis on data-point x sampled from D_s or D_t.

This translates to calculating the capacity of the hypothesis class $\mathcal{H}$ to distinguish between samples generated from both domains $D_s$ and $D_t$. For a symmetric hypothesis class, the $\mathcal{H}$-divergence can be calculated through a finite sample set sampled from both domains $U_s$ and $U_t$.

Calculating the value for $\mathcal{H}$-distance includes finding the hypothesis $h \in \mathcal{H}$ that has a minimum error on the binary classification problem between $U_s$ and $U_t$ samples selected from both the source and target domains $U_s$ and $U_t$. This can be approximated through a model that learns to discriminate between the source and target examples. This may be referred to as a Proxy A-distance (PAD). Given a domain classifier $G_d:x \rightarrow [0,1]$ parameterized by θd, the PAD can be calculated as follows:

$$PAD = (1-2\varepsilon(G_d))$$

s.t.;

$$\varepsilon(G) = 1 - \Sigma_{x_i \in U_s, U_d} |G(x_i) - I(x_i \in U_s)|$$

where I is an indicator function. Where ε denotes the error of the domain classifier G, G(x_i) is 1 if G predicts that x_i belongs to domain U_s and I(x_i∈U_s) if x_i indeed belongs to U_s.

The PAD metric is task-agnostic and measures only the co-variate shift. PAD can be used to measure domain discrepancy between datasets for NLP applications. However, the NLP model 124 may not only compute a mapping between input and labels, but also infer an intermediate representation. For a given task, the intermediate representation may provide a view of the input that highlights the relevant part that could be helpful for a correct classification in this task. In particular, the intermediate representation should not be sensitive to task-irrelevant features that provide nevertheless strong signals to distinguish between the source and the target domains (yielding high PAD values).

The present application involves a second PAD metric/measure. The second PAD metric is the classification accuracy of discriminating between the intermediate representation coming from—respectively—the source and target domain. The second PAD metric is generated using the last layer of a neural network, as discussed further below. Assume that the task classifier C consists of two functions $G_f$ and $G_y$. The first projects the input to a hidden representation of size m:$G_f:X \rightarrow \mathbb{R}^m$ while the second is a linear layer that uses this representation to predict the class labels $G_y$: $\mathbb{R}^m \rightarrow [0,1]^{|Y|}$. Differently from the PAD metric provided above, the domain classifier $G^*_d:\mathbb{R}^m \rightarrow [0,1]$ takes the hidden representations as an input instead of the original input. The learnable parameters of $G_f$, $G_y$, and $G^*_d$ are $\theta_f$, $\theta_y$ and $\theta^*_d$, respectively. The second PAD metric can be described by the equation $$PAD^* = 1 - 2\varepsilon(G^*_d(G_f(x)))$$

where PAD* is the second PAD metric, ε is a predetermined scalar value, and $\theta_f$ and $\theta_y$ are learned by minimizing the loss function of the task. Afterwards, $\theta_f$ is maintained (frozen) and $\theta^*_d$ is learned by minimizing the negative log likelihood loss for the domain discrimination task of $U_d$ and the training subsets of $U_s$. The second PAD metric provides an estimate of accuracy of the NLP model 124. The accuracy drop can be determined by a change in the second PAD metric, for example, relative to an initial value of the second PAD metric after training.

Confidence Based Metrics

While the final decision of classifiers is discrete, the weight given to that decision can be interpreted as the confidence the NLP model 124 has in that decision. Domain shift may be overcome by using self-training by selecting the most confident examples as new training examples together with the predicted class as pseudo-labels. Neural networks, however, may provide wrongly calibrated confidence scores, which may mean that the associated probability scores to the predicted class label may not reflect its correctness likelihood.

Calibration may help overcome this problem. For example, a post-training method that rescales the logits of the neural network model to soften the softmax by raising the output entropy of the probabilities scores may be used. Given a model trained on the source domain dataset $U_s$, let z be the logits vector produced by the last layer of the neural network for a given input, yielding the (first) non-calibrated confidence score (CONF) $q = max_i(softmax_i(z))$. for the predicted class label. The (second) calibrated confidence score (CONF_CALIB) $\hat{q}_t$ is then calculated as follows:

$$\hat{q}_t = \underset{k}{\max} (\sigma_{sm}(z_i/T))^k$$

where T is a learnable scalar temperature parameter, z_i are the logits and $\sigma_{sm}$ denotes the softmax operator T may be learned by minimizing the negative log likelihood loss over the validation set $U_s^{val}$, $$T^* = \underset{T}{argmin} \left( -\sum_{i=1}^{N} \mathbb{1}_{[k=y_i]} \log(softmax_i(z/T)) \right) (x_i, y_i) \in U_s^{val}, T > 0$$

where $\mathbb{1}_{[k=y_i]}$ is a one hot vector containing a 1 in front of the true class label $y_i$ and zeros otherwise.

The present application involves the following two confidence based metrics to measure the domain shift between the source and the target datasets $U_s$ and $U_t$.

A first confidence value (CONF) reflects a drop in average probability scores of the predicted class and can be represented by the following equation:

$$CONF = \frac{1}{|U_s|}\sum_{i:x_i \in U_s} q_i - \frac{1}{|U_t|}\sum_{j:x_j \in U_t} q_j,$$

where q_i is the confidence metric computed over data-point x_i (idem for q_j), and CONF is the first confidence metric.

A second confidence value (CONF_CALIB) reflects a drop in average calibrated probability scores for the predicted class and can be represented by the following equation:

$$CONF\_CALIB = \frac{1}{|U_s|}\sum_{i:x_i \in U_s} \hat{q}_i - \frac{1}{|U_t|}\sum_{j:x_j \in U_t} \hat{q}_j$$

where $\hat{q}_i$ is the calibrated confidence metric for data-point x_i, and CONF_CALIB is the second confidence metric.

Reverse Classification Accuracy

Reverse classification accuracy (RCA) involves use of a classifier trained on the source domain $U_s$ to pseudo-label the target domain $U_t$. The new dataset is then used to train a new classifier whose accuracy is measured on held-out data from the source domain. A proxy for domain shift is created as follows. A task classifier C is trained on the annotated source domain dataset $U_s$ which is then run to create pseudo-labels for the unlabeled target data $U_t$. The pseudo-labels are then used as training data for a reverse classifier $\overline{C}$ using the same architecture and training algorithm used to obtain C. The performance of both classifiers is compared on a held out subset $U'_s \in U_s$ from the source domain $U_s$ and used to define a first reverse classification accuracy (RCA) metric as follows:

$$RCA *= \frac{1}{U'_s}\sum_{x_i,y_i \in U'_s}^{m'} \mathbb{1}[y_i = C(x_i)] - \mathbb{1}[y_i = \overline{C}(x_i)]$$

The first RCA metric, however, could be low for example due to domain shift where a different distribution may have an impact in the training data generated on top of $U_t$. As another example, the first RCA metric could be low due to an accumulation of error created by back-and-forth training. If $U_t$ follows the same distribution than $U_s$, then the first RCA metric may only capture the impact of that accumulation of errors.

To prevent the first RCA metric from being too low due to that accumulation of errors, the present application involves a second RCA metric (RCA*) which may be the performance difference of $\hat{C}$ and a classifier C' trained in the same way but, using as the target domain, held out data from the source domain $U_s$. C is again used to pseudo-label a dataset, which is taken from the same distribution as the source domain $U_s$, and the new dataset is then used as training data for C'. The second RCA metric can be calculated as follows:

$$RCA *= \frac{1}{U'_s}\sum_{x_i,y_i \in U'_s}^{m'} \mathbb{1}[y_i = C'(x_i)] - \mathbb{1}[y_i = \overline{C}(x_i)],$$

where RCA* is the second RCA metric, C' is the classifier learned on out-of-domain data and $\hat{C}$ the classifier learned on held-out in-domain data.

Figure 3:
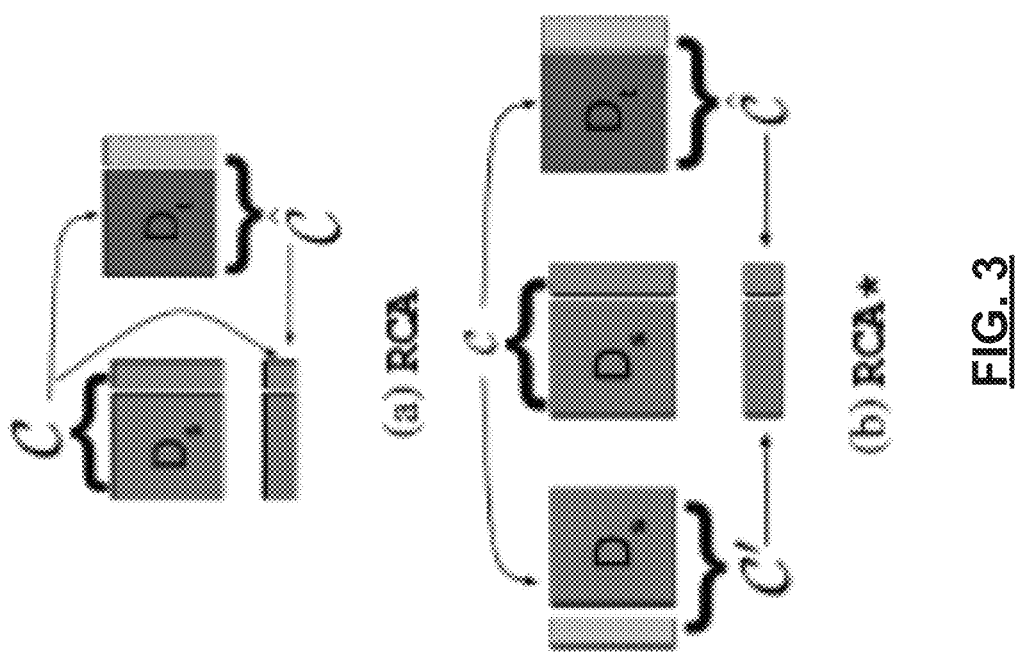
FIG. 3 is an example schematic of generating the first and second reverse classification accuracy (RCA) metrics.

FIG. 3 is an example schematic of generating the first and second RCA metrics.

Figure 4:
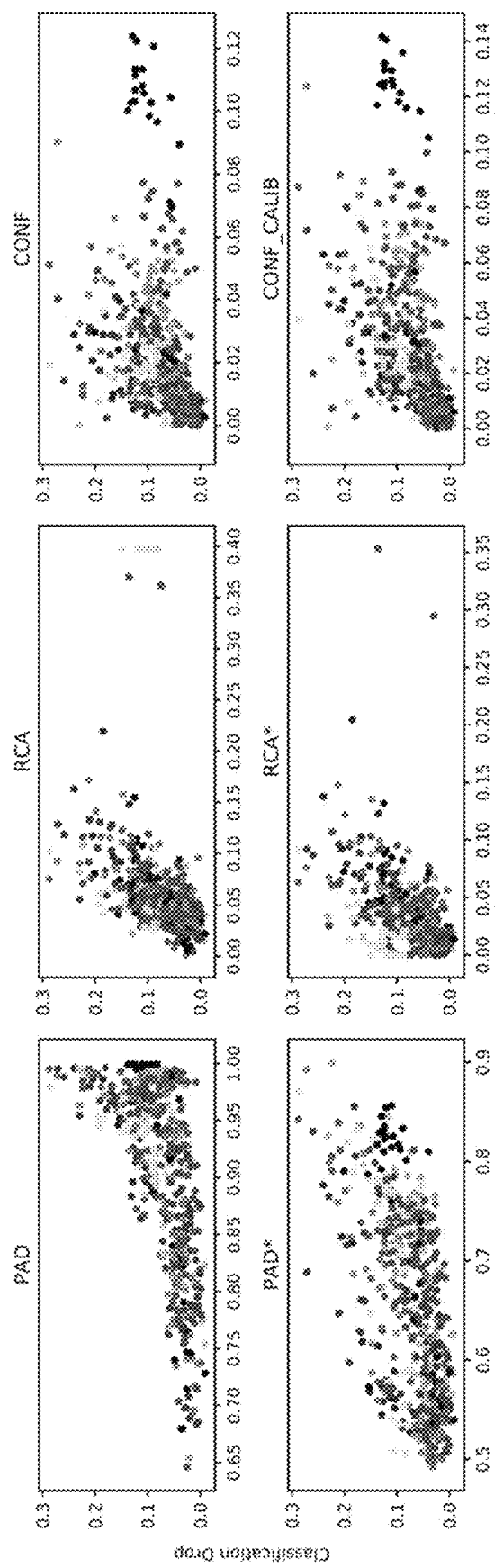
FIG. 4 includes scatter plots showing correlations between the values of similarity metrics on the x-axis and actual classification drops (y-axis) for sentiment analysis.

FIG. 4 includes scatter plots showing correlations between the values of each proposed similarity metric on the x-axis and the actual classification drop (y-axis) for the sentiment analysis task. Each point corresponds to a single domain shift example. Different colors represent different source domains and hence a single trained model on the source domain dataset.

Figure 5:
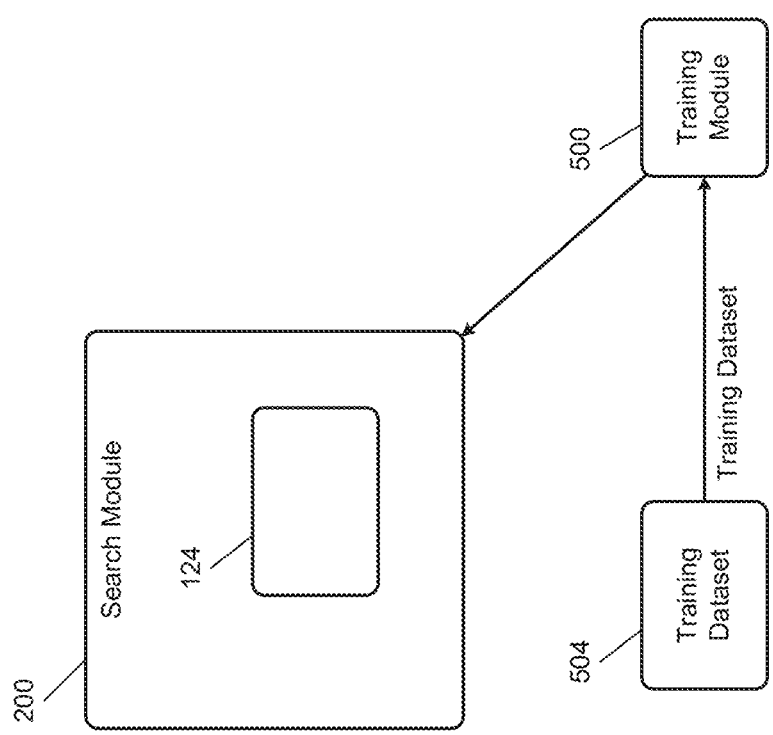
FIG. 5 is a functional block diagram of an example training module configured to train the search module.

FIG. 5 is a functional block diagram of an example training module 500 configured to train the search module 200. The training module 500 may train the search module 200, for example, using a neural network, such as a convolutional neural network, or in another suitable manner.

The training module 500 trains the search module 200 using a training dataset 504 stored in memory. When training is complete, the training module 500 stores parameters of the NLP model 124 in the search module 200. The training dataset 504 may include any suitable training dataset, such as one or more dataset discussed below.

Figure 6:
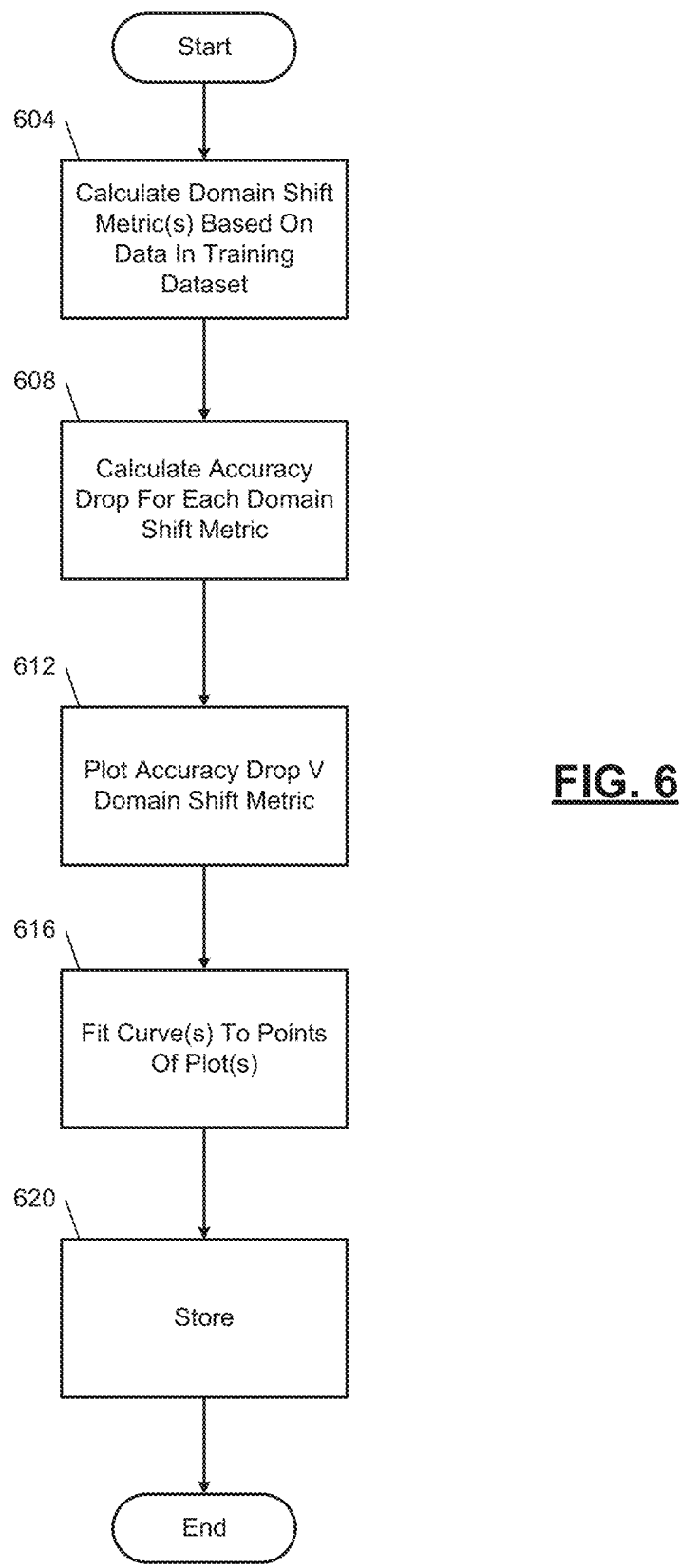
FIG. 6 is a flowchart depicting an example method of training the search module.

FIG. 6 is a flowchart depicting an example method of training the search module 200. Control begins with 604, where the training module 500 determines (or calculates) one or more of the domain shift metrics discussed above, such as the second PAD metric, the second confidence metric, and the second RCA metric. The training module 500 determines the one or more domain shift metrics based on data in the training dataset 504.

At 608, the training module 500 determines the accuracy drop for each of the one or more domain shift metrics, as discussed above. At 612, the training module 500 plots the accuracy drop (e.g., in a y-direction) versus domain shift metric (e.g., in an x-direction) for each of the domain shift metrics. The accuracy drop at a given domain shift metric value may be considered a point. As described above, FIG. 4 includes example graphs of accuracy drop versus domain shift metric for the domain shift metrics discussed above.

At 616, the training module 500 fits a curve to the points of a plot and determines an equation representative of the curve. The training module 500 may fit the curve, for example, using a regression fitting algorithm or another suitable type of curve fitting. The training module 500 may determine a curve and/or an equation (i.e., properties) for each of the different domain shift metrics. At 620, the training module 500 stores the curve(s) and/or the equation(s) in the accuracy module 220. Once stored, the accuracy module 220 can predict the accuracy drop of the NLP model 124 at runtime attributable to domain shift. While the example of FIG. 6 is shown as ending, control may return to 604.

Figure 7:
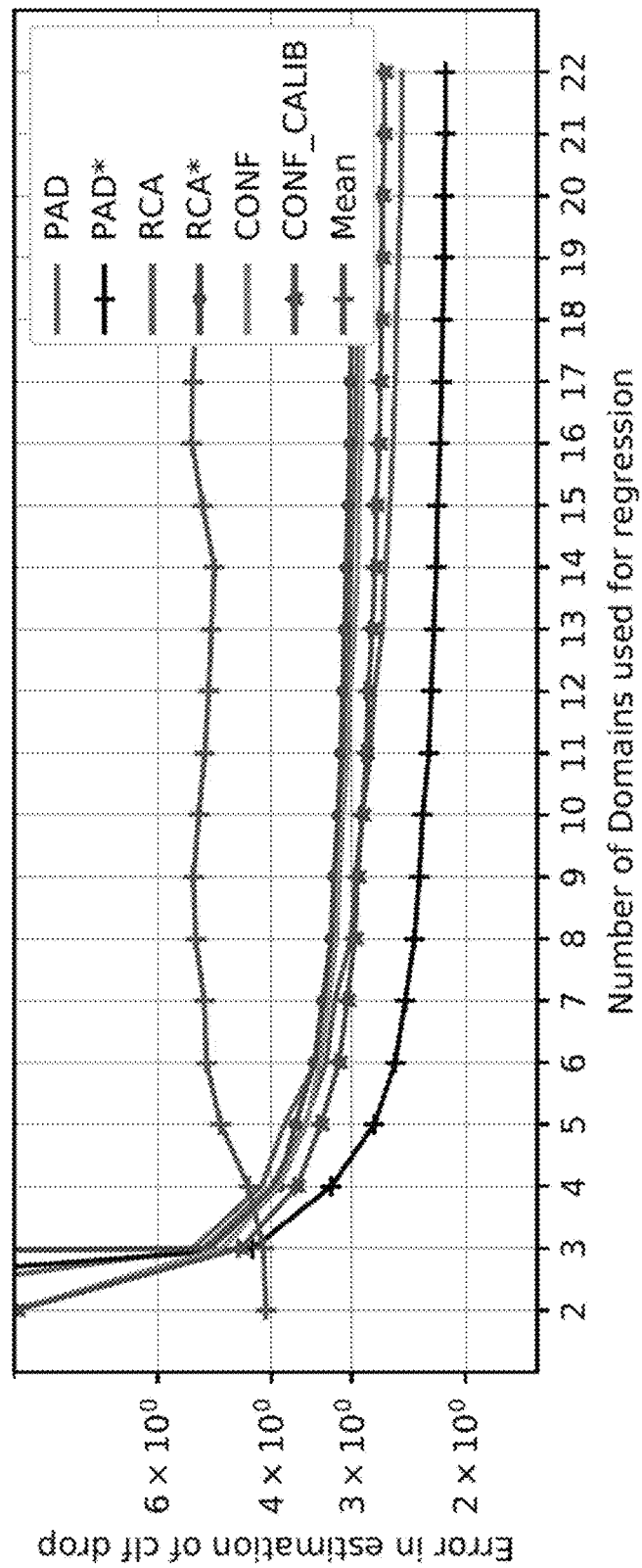
FIG. 7 includes a graph of error in the accuracy drop estimation for different domain shift metrics versus number of different domains used for training for the task of sentiment analysis.
Figure 8:
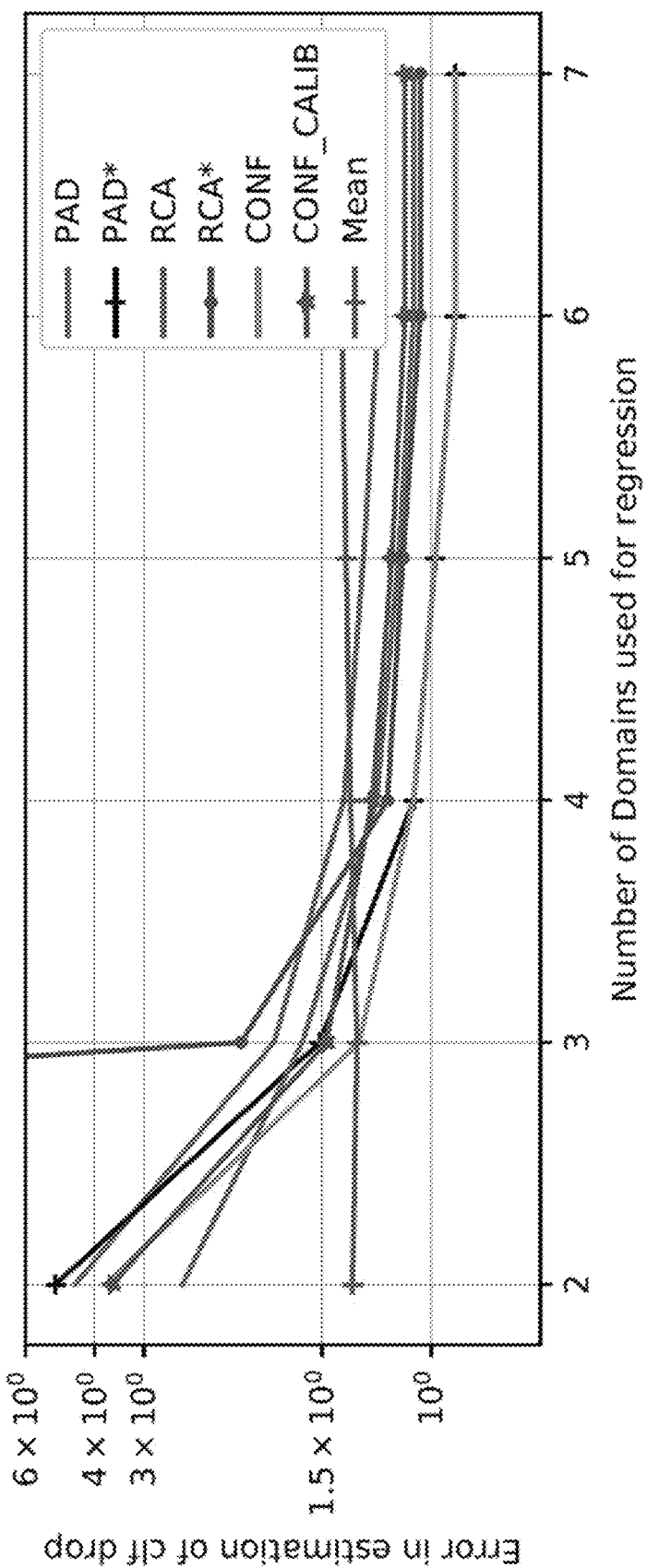
FIG. 8 includes a graph of error in the accuracy drop estimation for different domain shift metrics versus number of different domains used for training for the task of POS tagging.

The number of different domains used during the training may affect the accuracy of the accuracy drop prediction. FIG. 7 includes a graph of error in the accuracy drop estimation for different domain shift metrics versus number of different domains used for training for the task of sentiment analysis. FIG. 8 includes a graph of error in the accuracy drop estimation for different domain shift metrics versus number of different domains used for training for the task of POS tagging.

Figure 9:
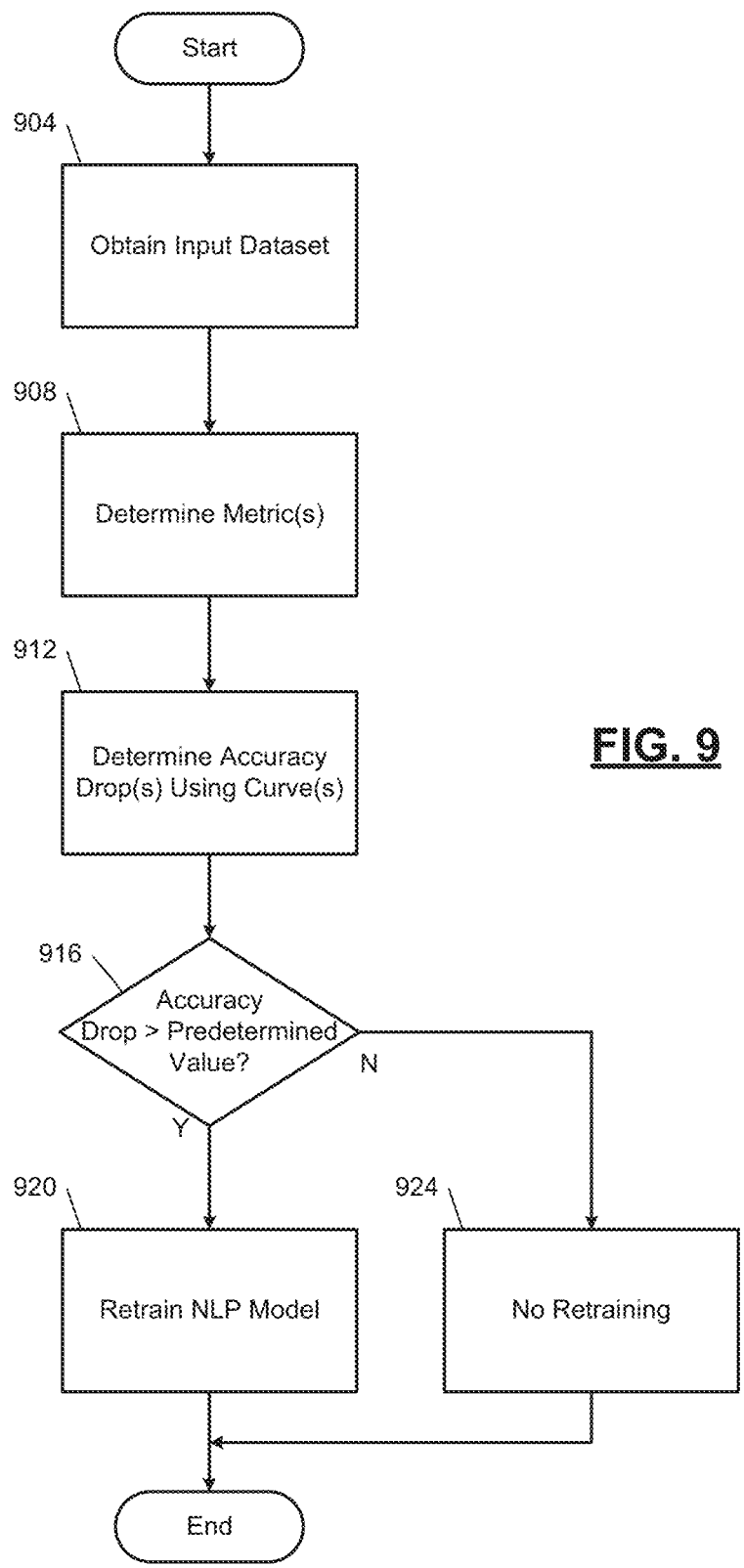
FIG. 9 is a flowchart depicting an example method of selectively triggering retraining.

FIG. 9 is a flowchart depicting an example method of selectively triggering retraining of the NLP model 124. Control begins with 904 where the accuracy module 220 obtains the input dataset from the dataset module 212. At 908, the accuracy module 220 determines one or more of the domain shift metrics based on the input dataset, as described above. At 912, the accuracy module 220 determines one or more accuracy drops of the NLP model 124 based on the one or more domain shift metrics using the curves for those domain shift metrics, respectively. For example, the accuracy module 220 may determine the accuracy drop of the NLP model 124 based on the second PAD metric using the equation or curve associated with the PAD metric. As another example, the accuracy module 220 may determine the accuracy drop of the NLP model 124 based on the second RCA metric using the equation or curve associated with the RCA metric. As another example, the accuracy module 220 may determine the accuracy drop of the NLP model 124 based on the second confidence metric (CONF_CALIB) using the equation or curve associated with the confidence metric.

At 916, the retraining module 224 determines whether the accuracy drop is greater than a predetermined value. The predetermined value is greater than zero. If 916 is true, the retraining module 224 triggers a retraining of the NLP model 124 at 920. If 916 is false, the retraining module 224 may not trigger a retraining of the NLP model 124 and maintain the NLP model 124 without retraining at 924. While the example of FIG. 9 is shown as ending, control may return to 904.

Datasets and Experiments

For sentiment analysis a multi-domain reviews dataset in English language may be used for training of the NLP model 124. Although this dataset includes several domains, the domains come from the same platform and may therefore may not be as diverse as desired. To alleviate this concern, the one or more other datasets may be used additionally or alternatively, such as movie reviews datasets. Each of these datasets includes textual reviews indicative of a sentiment for a subject (e.g., a product, a business, a movie, etc.).

Preprocessing may include: after removing redundant reviews, preprocess the dataset to obtain binary labels such that reviews with 1 to 3 stars are labeled as negative while reviews with 4 or 5 stars are labeled as positive. The reviews of the dataset may be randomly sampled (e.g., using 10K reviews for train, 10K reviews for validation, and 1K reviews for testing). The movie reviews datasets may follow the same preprocessing steps and are added as 2 extra domains. This yield in total a new dataset with 23 domains for sentiment analysis yielding 506 domain shift scenarios.

For part of speech (POS), 4 Universal Dependencies datasets for English may be used. The English web treebank (EWT) dataset may be split according to each sub-category, while keeping the rest of the smaller datasets as is. This yields in total 8 domains with roughly comparable sizes (e.g., approximately 4K sentences each) yielding in total 56 domain shift scenarios.

For each domain shift scenario, the NLP model 124 may be trained on the source domain training split. Testing is performed on both source and target domains test sets. Simultaneously, calculate each of the domain shift metrics described above. Note that some of those metrics such as first and second PAD and RCA metrics may involve the inputs of the target domain test set. None of the proposed domain shift metrics involve any labels from the target domain. This provides for the unsupervised scenario.

The initial word embeddings are a hyperparameter, and may be randomly initialized, pretrained GloVe with several dimensions and contextualized word embeddings using ELMo. As architectures for the NLP model 124, a multi-layer Bi-LSTM (long short term memory) may be used followed by a multi-layer feed-forward neural network (NN) and a softmax layer.

For sentiment analysis, the feed forward network may be applied on the last output of the Bi-LSTM to produce one label prediction for the whole sentence. For POS tagging, the feed forward network may be applied to each output to produce a label prediction for each corresponding token.

For training the domain classifiers used to calculate the first and second PAD metrics, a similar architecture for the NLP model 124 may be used as in sentiment analysis. The NLP model 124 may be initialized from scratch in case of the first PAD metric or initialized with the weights of the best task model in case of the second PAD metric. Afterwards, training to discriminate between inputs of the source and target domain datasets may be performed.

To calculate the second confidence metric, a best performing NLP model may be selected and its confidence weights may be calibrated using temperature scaling on the source domain validation set.

Each model may be trained using Adam optimization and early stopping with patience 5 over the source domain validation set.

Evaluation Results

Each point in FIG. 4 corresponds to a single domain shift scenario. While there is an overall trend between each of the proposed domain shift metrics and the actual drop in classification accuracy, the actual trend differs depending on which source domain was used. This illustrates that all of the domain shift metrics but the first and second PAD metric are model-specific. Instead of computing overall correlation trends, an evaluation of the capacity of each metric to serve as a predictor of the classification drop is provided below.

To predict the performance drop, each single domain shift scenario consists of a single source domain ds and target domain $d_t$. For each of the proposed metrics a regression line may be fit between the drop in classification accuracy and each of value of this metrics between ds and do, where $do \in D \backslash \{d_s, d_t\}$ is a test split of each other domains not included in this domain shift scenario. Then, the regression fit line can be used to predict the performance drop when using the NLP model trained over $d_s$ and evaluated on $d_t$, compute the error with respect to the real drop and report in Table 1 the average and maximum such error. Also reported is the error of predicting always the mean classification drop over $D \backslash \{d_s, d_t\}$.

As shown in Table 1, predicting the mean performance drop achieves on average an error of 5.2% and 12.77% in a worst case for sentiment analysis, while this number drops for POS tagging to a mean of 1.06% and 1.67% for a worst case. All of the proposed metrics are improve significantly over that, with the second PAD metric improving over the other domain shift metrics in both datasets. Overall, the best performing metric may be the second PAD metric with 2.15% and 0.88% average error in prediction of performance drop for sentiment analysis and POS tagging, respectively.

|  | Sentiment | | POS tagging | |
| --- | --- | --- | --- | --- |
|  | mean | max | mean | max |
| Mean | 5.2 ± 2.02 | 12.77 | 1.06 ± 0.36 | 1.67 |
| RCA | 2.88 ± 1.31 | 7.17 | 1.08 ± 0.31 | 1.58 |
| RCA* | 2.92 ± 1.39 | 7.42 | 1.05 ± 0.27 | 1.42 |
| CONF | 2.85 ± 1.69 | 8.86 | 0.89 ± 0.39 | 1.75 |
| CONF_CALIB | 2.67 ± 1.49 | 8.13 | 1.12 ± 0.45 | 1.83 |
| PAD | 2.51 ± 1.54 | 8.16 | 1.24 ± 0.37 | 1.7 |
| PAD* | 2.15 ± 0.88 | 4.64 | 0.89 ± 0.1 | 0.99 |
| Ensemble | 2.22 ± 0.9 | 5.02 | 1.03 ± 0.42 | 1.78 |

Learning an ensemble between all metrics does not guarantee to provide the best predictions, which could be due to the small size of the points used for the regression fitting. Having a large number of different source domains may be difficult to achieve. The impact of a lower number of source domains from which to learn the classification drop is evaluated in the following. The learning may include randomly sampling a smaller number of datasets, and repeating the experiment. FIG. 7 includes a graph of error in the accuracy drop estimation for different domain shift metrics versus number of different domains used for training for the task of sentiment analysis. FIG. 8 includes a graph of error in the accuracy drop estimation for different domain shift metrics versus number of different domains used for training for the task of POS tagging. FIGS. 7 and 8 are generated based on 5 different runs of the sampling. The error decreases by increasing the number of domain test sets. However, prediction error may enter an acceptable score with only 3 annotated source domains.

The first and second PAD metrics may be calculated solely from learning to classify between the source and target domains and may therefore be particularly sensitive to co-variate shift (a change in the marginal distribution $p(x)$ that has no impact in the conditional $p(y|x)$). An adversarial experiment may be performed to evaluate this.

For each domain shift scenario in the sentiment analysis task a different unique tag <SOURCE> and <TARGET> may be added in the beginning of each example in the source and the target domains respectively. This may have no impact on the final task classification, but may make it trivial to discriminate between the domains. The results of re-running the same experiment on this modified dataset are provided in Table 2.

|  | mean ± std | max |
| --- | --- | --- |
| Mean | 4.35 ± 2.31 | 10.79 |
| RCA | 3.63 ± 1.95 | 9.56 |
| RCA* | 3.67 ± 1.93 | 8.44 |
| CONF | 2.88 ± 1.16 | 5.5 |
| CONF_CALIB | 2.81 ± 1.09 | 5.48 |
| PAD | 4.35 ± 2.31 | 10.79 |
| PAD* | 4.6 ± 2.14 | 10.77 |
| Ensemble | 3.02 ± 0.98 | 5.88 |

As shown, the first PAD metric may be affected, and may or may not perform better than the baseline which just predicts the mean classification drop. The other two domain shift metrics may be less affected or not at all affected. The second PAD metric also degrades, despite using a task representation which should learn to discard a useless (for the task prediction) newly introduced token. To understand this better, the behavior of the models with different depths can be analyzed.

Figure 10:
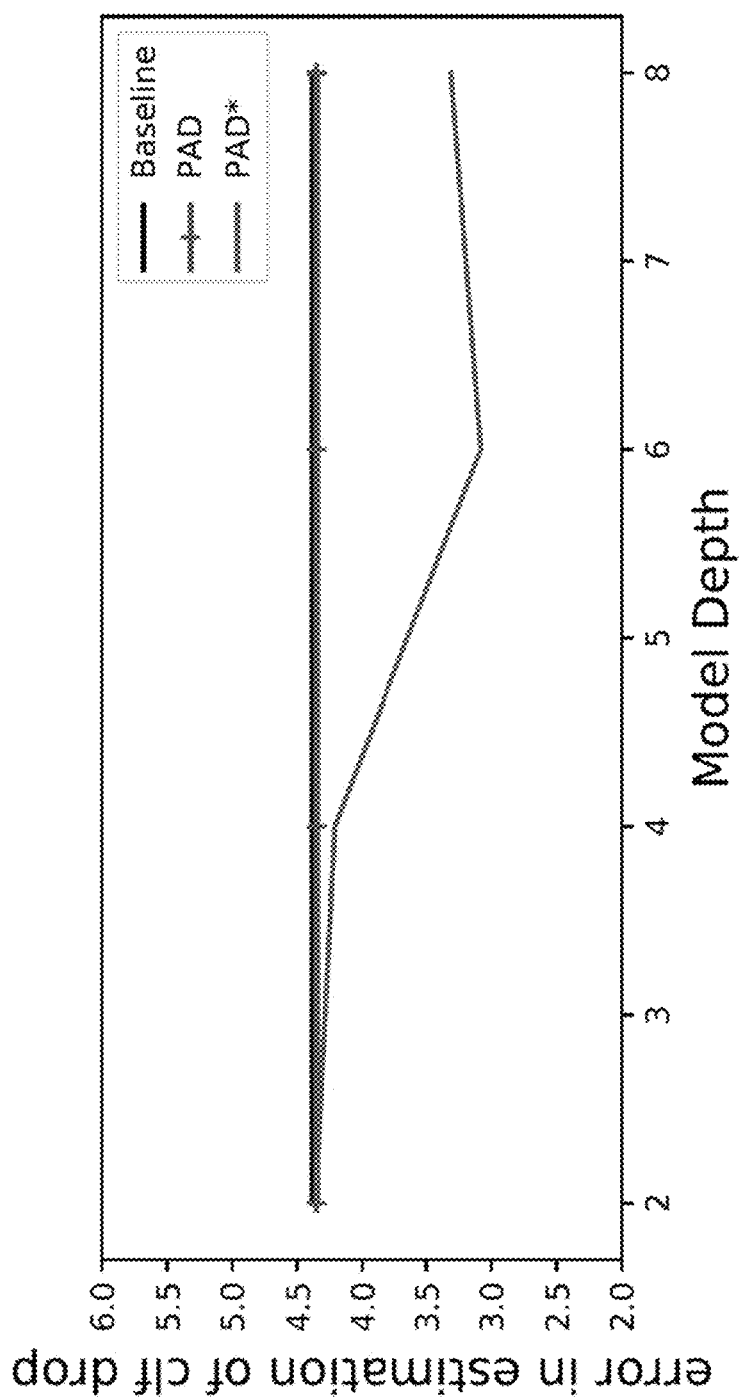
FIG. 10 illustrates a graph of error in estimation of drop versus model depth for various domain shift metrics.
Figure 11:
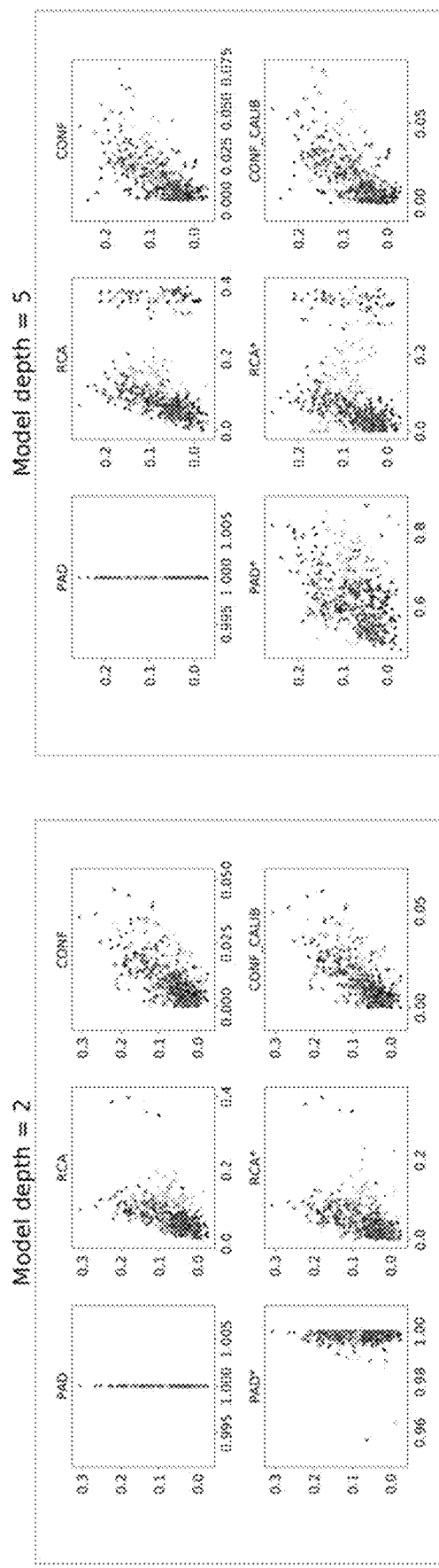
FIG. 11 includes the plots of FIG. 4 repeated for an adversarial dataset restricting the hyperparameter search of the task model to models of a fixed depths.

FIG. 10 illustrates a graph of error in the estimation of drop versus model depth for the baseline, first, and second PAD metrics. The results indicate that the capacity for predicting the classification drop using the second PAD metric (PAD*) may be influenced only if the NLP model is very shallow. This becomes clearer from FIG. 11 where the plots from FIG. 4 are repeated for this adversarial dataset restricting the hyperparameter search of the task model to models of a fixed depths. At any model depth the first PAD metric is a maximal (1.00) as it learns to differentially perfectly the two domains. While is also the case for the second PAD metric in the case of model of depth 2, deeper models are less sensitive to that. This might indicate that the higher layer (which are used as input representation for the domain classification models used to calculate the second PAD metric) are learning to ignore the domain token as it may be irrelevant for the task at hand. The rest of the domain shift metrics may be more robust with respect to adversarial examples and model depth, which might make them good candidates for cases of severe co-variate shift.

The above involves the prediction of performance drop due to domain shift for NLP models having no labeled target domain data but at least two labeled source domains. Three different domain shift metrics are described for measuring domain similarity. The second metrics of each family provide higher prediction scores of the performance drop than the respective first metrics. This drop can be estimated relatively accurately even when only few other source-domains evaluation datasets are available. The H-divergence based metrics may perform the best. However, they may be prone to fail when there is a large change in marginal distribution. Using a task-specific representation may be more robust to that problem, although only if a deeper model is used. The confidence-based metrics are valuable but may involve access to the confidence weights and not only the predicted labels by the model.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
  a natural language processing (NLP) model trained in a training domain and configured to perform natural language processing on an input dataset;
  an accuracy module configured to:
    calculate a domain shift metric based on the input dataset; and
    calculate a predicted decrease in accuracy of the NLP model attributable to domain shift relative to the training domain based on the domain shift metric; and
  a retraining module configured to selectively trigger a retraining of the NLP model based on the predicted decrease in accuracy of the NLP model wherein one of:
  (a) the domain shift metric is a proxy A domain (PAD) metric and the accuracy module is configured to calculate the domain shift metric using the equation $$PAD^* = 1 - 2\varepsilon(G^*_d(G_f(x)))$$

where PAD* is the domain shift metric, $\varepsilon$ is a predetermined scalar value, and $\theta_f$ and $\theta_y$ are parameters of a first function $G_f$ and a second function $G^*_d$ learned by minimizing a loss function, and learnable parameters of $G_f$ and $G^*_d$ are learned parameters; and (b) the domain shift metric is a reverse classification accuracy (RCA) metric and the accuracy module is configured to calculate the domain shift metric using the equation:

$$RCA* = \frac{1}{U'_s}\sum_{x_i,y_i \in U'_s}^{m'} \mathbb{1}[y_i = C'(x_i)] - \mathbb{1}[y_i = \overline{C}(x_i)],$$

where RCA* is the domain shift metric, C' is a classifier learned on out-of-domain data and $\overline{C}$ the classifier learned on held-out in-domain data, $x_i$ and $y_i$ are data-points, $U_s'$ represents data in the training domain.

2. The system of claim 1 wherein the retraining module is configured to trigger a retraining of the NLP model when the predicted decrease in accuracy of the NLP model is greater than a predetermined value, wherein the predetermined value is greater than zero.

3. The system of claim 1 further comprising a results module configured to:

determine a sentiment regarding a subject based on an output of the NLP model; and provide results including the sentiment to a computing device from which a query regarding the subject was received.

4. The system of claim 1 further comprising a results module configured to determine a tag for a point of speech (POS) based on an output of the NLP model.

5. The system of claim 1, wherein the NLP model is trained based on a training dataset that is different than the input dataset.

6. The system of claim 5 wherein the training domain of the training dataset is different than a second domain of the input dataset.

7. The system of claim 1 wherein the input dataset includes text of N social media posts, wherein N is an integer greater than 0.

8. A system comprising:

a training module configured to:

train, using a training dataset in a training domain, a machine learning (ML) model to perform processing on an input dataset;

determine properties of a domain shift metric for the training dataset in the training domain;

an accuracy module configured to:

calculate the domain shift metric based on the input dataset; and calculate a predicted decrease in accuracy of the ML model attributable to domain shift relative to the training domain based on the domain shift metric using the properties of the domain shift metric for the training dataset; and a retraining module configured to selectively trigger a retraining of the ML model based on the predicted decrease in accuracy of the ML model, wherein one of:

(a) the domain shift metric is a proxy A domain (PAD) metric and the accuracy module is configured to calculate the domain shift metric using the equation $$PAD* = 1 - 2\varepsilon(G^*_d(G_f(x)))$$

where PAD* is the domain shift metric, $\varepsilon$ is a predetermined scalar value, and $\theta_f$ and $\theta_y$ are parameters of a first function $G_f$ and a second function $G^*_d$ learned by minimizing a loss function, and learnable parameters of $G_f$ and $G^*_d$ are learned parameters; and (b) the domain shift metric is a reverse classification accuracy (RCA) metric and the accuracy module is configured to calculate the domain shift metric using the equation:

$$RCA* = \frac{1}{U'_s}\sum_{x_i,y_i \in U'_s}^{m'} \mathbb{1}[y_i = C'(x_i)] - \mathbb{1}[y_i = \overline{C}(x_i)],$$

where RCA* is the domain shift metric, C' is a classifier learned on out-of-domain data and $\overline{C}$ the classifier learned on held-out in-domain data, $x_i$ and $v_i$ are data-points, $U_s'$ represents data in the training domain.

9. The system of claim 8 wherein the retraining module is configured to trigger a retraining of the ML model when the predicted decrease in accuracy of the ML model is greater than a predetermined value, wherein the predetermined value is greater than zero.

10. The system of claim 8, wherein the ML model is a natural language processing (NLP) model that is trained based on a training dataset that is different than the input dataset.

11. A computerized method performed by one or more processors, the method comprising:

training a natural language processing (NLP) model using a training dataset to perform natural language processing on an input dataset;

after receiving the input dataset that is different than the training dataset:

calculating a domain shift metric based on the input dataset; and calculating a predicted decrease in accuracy of the NLP model attributable to domain shift relative to a training domain based on the domain shift metric; and selectively triggering a retraining of the NLP model based on the predicted decrease in accuracy of the NLP model, wherein one of:

(a) the domain shift metric is a proxy A domain (PAD) metric and the calculating the domain shift metric includes calculating the domain shift metric using the equation $$PAD* = 1 - 2\varepsilon(G^*_d(G_f(x)))$$

where PAD* is the domain shift metric, $\varepsilon$ is a predetermined scalar value, and $\theta_f$ and $\theta_y$ are parameters of a first function $G_f$ and a second function $G^*_d$ learned by minimizing a loss function, and learnable parameters of $G_f$ and $G^*_d$ are learned parameters; and (b) the domain shift metric is a reverse classification accuracy (RCA) metric and the calculating the domain shift metric includes calculating the domain shift metric using the equation:

$$RCA* = \frac{1}{U'_s}\sum_{x_i,y_i \in U'_s}^{m'} \mathbb{1}[y_i = C'(x_i)] - \mathbb{1}[y_i = \overline{C}(x_i)],$$

where RCA* is the domain shift metric, C' is a classifier learned on out-of-domain data and $\overline{C}$ the classifier learned on held-out in-domain data, $x_i$ and $y_i$ are data-points, $U_s'$ represents data in the training domain.

12. A system comprising:
a natural language processing (NLP) model trained in a training domain and configured to perform natural language processing on an input dataset;
a means for:
calculating a domain shift metric based on the input dataset; and
calculating a predicted decrease in accuracy of the NLP model attributable to domain shift relative to the training domain based on the domain shift metric; and
a means for selectively triggering a retraining of the NLP model based on the predicted decrease in accuracy of the NLP model,
wherein one of:
(a) the domain shift metric is a proxy A domain (PAD) metric and the means for calculating the domain shift metric is configured to calculate the domain shift metric using the equation $$PAD* = 1 - 2\varepsilon(G^*_d(G_f(x))),$$

where PAD* is the domain shift metric, $\varepsilon$ is a predetermined scalar value, and $\theta_f$ and $\theta_y$ are parameters of a first function $G_f$ and a second function $G^*_d$ learned by minimizing a loss function, and learnable parameters of $G_f$ and $G^*_d$ are learned parameters; and (b) the domain shift metric is a reverse classification accuracy (RCA) metric and the means for calculating the domain shift metric is configured to calculate the domain shift metric using the equation:

$$RCA* = \frac{1}{U'_s}\sum\nolimits_{x_i, y_i \in U'_s}^{m'} \mathbb{1}[y_i = C'(x_i)] - \mathbb{1}[y_i = \bar{C}(x_i)],$$

where RCA* is the aomain snip metric, C' is a classifier learned on out-of-domain data and $\bar{C}$ the classifier learned on held-out in-domain data, $x_i$ and $y_i$ are datapoints, $U'_s$ represents data in the training domain.

* * * * *